3,822,320
BERYLLIUM CHLORIDE MONOETHERATE

Lz F. Lamoria, Bay City, and Paul F. Reigler, Midland, Mich., assignors to The Dow Chemical Company, Midland, Mich.
No Drawing. Filed Dec. 28, 1964, Ser. No. 423,638
Int. Cl. C07c 43/04
U.S. Cl. 260—614 R                1 Claim This invention relates to a novel inorganic etherate material and more particularly is concerned with the novel compound beryllium chloride monodiethyletherate.

This novel composition finds utility as a reactant in the metathetical preparation of beryllium hydride by reaction with light metal hydrides, such as lithium aluminum hydride, for example, in ether solution. Use of the present novel beryllium chloride monoetherate in such applications provides the unexpected advantage that this material readily and easily dissolves in ethers, such as diethyl ether for example, with no apparent exothermic reaction.

The novel beryllium chloride monodiethyletherate of the present invention is a white, crystalline solid. It can be sublimed at a temperature of about 85° C. under a reduced absolute pressure of about $1 \times 10^{-3}$ mm. Hg.

The compound upon elemental analysis was found to agree in composition with the theoretical analysis calculated for the compound corresponding to the formula $BeCl_2 \cdot (C_2H_5)_2O$. It displayed a unique X-ray diffffraction pattern.

The compound readily dissolved in diethyl ether with no apparent exothermic reaction.

The following Example illustrates one mode of preparing the novel compound of the present invention but is not meant to be limiting.

A substantially anhydrous diethyl ether solution (~200 milliliters) containing about 4 grams of beryllium chloride was placed in a 500 milliliter flask positioned on a water bath maintained at from about 60 to about 70° C. The flask was connected to a low pressure line having a cold trap maintained at about minus 196° C. in the system. The ether solvent then was removed from the solution. When substantially all of the ether had been removed from the reaction mass, a liquid remained in the flask which was further subjected to the reduced pressure at about room temperature (i.e. ~20–25° C.) for about 72 hours. After this treatment, a white, crystalline solid remained. This product was heated at about 85° C. for about 16 hours at a reduced absolute pressure of about $1 \times 10^{-3}$ mm. mercury. During this period some sublimation of the product occurred.

Elemental analysis and a comparison of X-ray diffraction pattern of the sublimed and unsublimed product indicated both were the same material.

Elemental analysis of the white, crystalline product showed on a weight basis chloride-43.2%, beryllium-5.65%, carbon-30.5%, hydrogen-6.6%, oxygen (calculated)-10.2%. The theoretical analysis for beryllium chloride monodiethyl etherate, $BeCl_2 \cdot (C_2H_5)_2O$ is chloride-46.0%, beryllium-5.8%, carbon-31.2%, hydrogen-6.5%, oxygen-10.5%.

X-ray diffraction analysis of the product gave the following pattern.

| d: | $I/I_1$ | d: | $I/I_1$ |
|---|---|---|---|
| 7.3 | 100 | 2.06 | 8 |
| 6.1 | 80 | 2.03 | 8 |
| 5.25 | 20 | 1.99 | 8 |
| 4.59 | 32 | 1.905 | 11 |
| 4.08 | 32 | 1.83 | 3 |
| 3.90 | 10 | 1.795 | 8 |
| 3.55 | 40 | 1.77 | 14 |
| 3.25 | 48 | 1.74 | 3 |
| 3.19 | 24 | 1.69 | 3 |
| 3.10 | 13 | 1.59 | 14 |
| 2.94 | 64 | 1.575 | 8 |
| 2.75 | 13 | 1.53 | 3 |
| 2.69 | 6 | 1.487 | 5 |
| 2.62 | 6 | 1.465 | 3 |
| 2.53 | 28 | 1.430 | 3 |
| 2.47 | 28 | 1.405 | 10 |
| 2.40 | 16 | 1.382 | 3 |
| 2.34 | 11 | 1.348 | 5 |
| 2.26 | 32 | 1.311 | 3 |
| 2.17 | 16 | 1.305 | 3 |

In the above listing "d" represents the interplanar spacings of the planes in A. based upon Miller indices and "$I/I_1$" is the relative line intensity compared to the strongest line based at 100.

The compound readily dissolved in diethyl ether with no apparent exothermic reaction.

The product showed no apparent degradation after storage for an extended period of time in a substantially anhydrous, inert atmosphere.

Various modifications can be made in the preparation of the present novel compound without departing from the spirit or scope thereof for it is to be understood that we limit ourselves only as defined in the appended claim.

We claim:
1. Beryllium chloride monodiethyletherate.

References Cited

Silber, Chem. Abs., vol. 46, p. 8555 (1952).
Turova et al., Chem. Abs., vol. 55, p. 19435 (1961).
The Condensed Chemical Dictionary, Reinhold, New York, 1956, p. 149.

LELAND A. SEBASTIAN, Primary Examiner

U.S. Cl. X.R.
423—645